(12) United States Patent
Bettoja et al.

(10) Patent No.: US 10,711,740 B2
(45) Date of Patent: Jul. 14, 2020

(54) SYSTEM FOR FEEDING AIR TO AN INTERNAL COMBUSTION ENGINE

(71) Applicant: C.R.F. Società Consortile per Azioni, Orbassano, (Turin) (IT)

(72) Inventors: Federica Bettoja, Orbassano (IT); Walter Ferraris, Orbassano (IT); Fausto Di Sciullo, Turin (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 0 days.

(21) Appl. No.: 16/156,280

(22) Filed: Oct. 10, 2018

(65) Prior Publication Data

US 2019/0186441 A1 Jun. 20, 2019

(30) Foreign Application Priority Data

Dec. 14, 2017 (EP) ..................................... 17207260

(51) Int. Cl.
*F02M 31/20* (2006.01)
*B60H 1/00* (2006.01)
(Continued)

(52) U.S. Cl.
CPC ....... *F02M 31/205* (2013.01); *B60H 1/00271* (2013.01); *B60H 1/00328* (2013.01);
(Continued)

(58) Field of Classification Search
CPC ............... F02M 31/205; F02B 29/0443; F02B 29/0412; F02B 37/00; B60H 2001/327;
(Continued)

(56) References Cited

U.S. PATENT DOCUMENTS 2,427,284 A * 9/1947 Jocelyn ................... F02B 33/00
123/563
2,898,745 A * 8/1959 Weisel ................ F02B 29/0443
60/599
(Continued)

FOREIGN PATENT DOCUMENTS

DE 102014220097 A1 4/2016
EP 0249718 A2 * 12/1987 .......... F02B 29/0443
(Continued)

OTHER PUBLICATIONS

European Search Report for EP 17 207 260.5 dated Mar. 27, 2018. 3 pages.

*Primary Examiner* — Thai Ba Trieu
(74) *Attorney, Agent, or Firm* — RMCK Law Group, PLC

(57) ABSTRACT

A system for feeding air to an engine of a vehicle includes a heat exchanger arranged along a duct for feeding air, downstream of a supercharging compressor, to cool a flow of air fed by the air compressor, by a fluid that circulates in an engine cooling circuit. The system also includes an evaporator, interposed in the duct downstream of the heat exchanger, to further cool the air flow by a coolant that circulates in an air conditioning circuit of the vehicle. The air conditioning circuit includes a coolant compressor and a controller for controlling activation of the coolant compressor, depending on a request for air conditioning of a passenger compartment of the vehicle, and a request for cooling the air fed to the engine. The electronic controller is configured to enable the coolant compressor to be activated only when the engine load is below a certain threshold.

3 Claims, 2 Drawing Sheets

(51) Int. Cl.
*B60H 1/32* (2006.01)
*F01P 3/12* (2006.01)
*F01P 9/06* (2006.01)
*F02B 29/04* (2006.01)
*F02B 37/00* (2006.01)
*F28D 21/00* (2006.01)

(52) U.S. Cl.
CPC ....... *B60H 1/00764* (2013.01); *B60H 1/3202* (2013.01); *B60H 1/323* (2013.01); *B60H 1/3227* (2013.01); *F01P 3/12* (2013.01); *F02B 29/0412* (2013.01); *F02B 29/0443* (2013.01); *F02B 37/00* (2013.01); *B60H 2001/327* (2013.01); *F01P 9/06* (2013.01); *F01P 2060/02* (2013.01); *F28D 2021/0085* (2013.01)

(58) Field of Classification Search
CPC .... B60H 1/323; B60H 1/3227; B60H 1/3202; B60H 1/00764; B60H 1/00271; F28D 2021/0085; F01P 3/12; F01P 9/06; F01B 2060/02
USPC ................................. 60/599, 605.1; 123/563
See application file for complete search history.

(56) References Cited

U.S. PATENT DOCUMENTS

| | | | | |
|---|---|---|---|---|
| 6,321,552 B1* | 11/2001 | Frederiksen | ........ | F02B 29/0443 60/599 |
| 6,604,515 B2* | 8/2003 | Marsh | ................ | F02B 29/0443 60/599 |
| 8,028,522 B2* | 10/2011 | Irmler | ....................... | F01P 3/18 60/599 |
| 8,490,392 B2* | 7/2013 | Kardos | ............... | F02B 29/0443 60/599 |
| 8,494,698 B2* | 7/2013 | Murata | ............... | F02B 29/0425 60/599 |
| 2005/0121006 A1* | 6/2005 | Lee | ..................... | F02B 29/0412 123/563 |
| 2010/0121508 A1* | 5/2010 | Murata | ............... | F02B 29/0425 701/22 |
| 2010/0191381 A1 | 7/2010 | Haussmann et al. | | |
| 2011/0146266 A1* | 6/2011 | Weinbrenner | ...... | F02B 29/0443 60/599 |
| 2013/0333674 A1* | 12/2013 | Brinkmann | ......... | F02B 29/0443 123/563 |
| 2015/0040874 A1* | 2/2015 | Isermeyer | .......... | B60H 1/00271 123/563 |
| 2016/0075208 A1* | 3/2016 | Goenka | ................. | B60H 1/005 62/99 |
| 2018/0194196 A1* | 7/2018 | Shepard | ............ | F01P 7/165 |
| 2019/0128171 A1* | 5/2019 | Kurimoto | ............ | F01P 7/165 |

FOREIGN PATENT DOCUMENTS

| | | |
|---|---|---|
| EP | 2098700 A2 | 9/2009 |
| EP | 2098700 A3 | 8/2012 |
| EP | 2977244 A1 | 1/2016 |
| JP | 6346227 U | 3/1988 |

* cited by examiner

SYSTEM FOR FEEDING AIR TO AN INTERNAL COMBUSTION ENGINE

CROSS-REFERENCE TO RELATED APPLICATION

This application claims priority to European Patent Application No. 17 207 260.5 filed Dec. 14, 2017. The disclosure of the above application is incorporated herein by reference in its entirety.

FIELD OF THE INVENTION

The present invention relates to systems for feeding air to an internal combustion engine of a motor-vehicle, of the type comprising:
  a duct for feeding air to the engine,
  an air compressor for the air fed to the engine, arranged along the feed duct, and driven by a turbine, which is in turn driven by a flow of exhaust gases of the engine,
  a heat exchanger arranged along the air feed duct, downstream of the air compressor, to cool a flow of supercharged air from the compressor by means of a coolant in a cooling circuit of the engine.

DESCRIPTION OF THE PRIOR ART

In supercharged internal combustion engines, the air compressed in the aforesaid supercharging compressor increases in temperature, leading to a reduction in the filling efficiency of the engine cylinders and, in the case of gasoline engines, increasing the tendency to detonation. The heat exchanger, or "intercooler", interposed in the air feed duct, downstream of the compressor, has the purpose of overcoming this drawback. The documents JP S6346627 U and EP 2 098 700 A2 disclose systems of the type indicated above wherein an evaporator is also interposed in the air feed duct, downstream of the aforementioned heat exchanger, to further cool the air flow by means of a coolant that circulates in an air conditioning circuit of the motor-vehicle. The preamble of claim 1 is based on EP 2 098 700 A2.

OBJECT OF THE INVENTION

The object of the invention is that of further improving the above-mentioned known systems, in particular with reference to an improved control of the system, an increase in its efficiency and, in particular, also with reference to a reduction in the fuel consumption of the engine.

SUMMARY OF THE INVENTION

In view of achieving the aforesaid object, the invention relates to a system for feeding air to an internal combustion engine of a motor-vehicle.

In a preferred embodiment, the first expansion valve and the second expansion valve are electronically-controlled expansion valves, and the electronic controller is configured to control both activation of the coolant compressor, and the first and second expansion valves according to signals indicating both the request for cooling the air fed to the engine, and the request for air conditioning of the passenger compartment of the motor-vehicle. The system can thus operate selectively in any of the following ways:
  with the coolant compressor in an active condition, with first and second expansion valves both opened, so as to activate both the main evaporator for cooling the air in the passenger compartment of the motor-vehicle, and the auxiliary evaporator for additional cooling of the air fed to the engine,
  with the coolant compressor in an active condition, with first expansion valve opened and second expansion valve closed, so that only the main evaporator for cooling the air in the passenger compartment of the motor-vehicle is activated, while the auxiliary evaporator is not activated,
  with the compressor of the coolant in an active condition, with the first expansion valve closed and the second expansion valve opened, so that only the auxiliary evaporator is active, while the main evaporator is not activated, and
  with the coolant compressor deactivated, so that both evaporators are inactive.

BRIEF DESCRIPTION OF THE DRAWINGS

Further characteristics and advantages of the invention will become apparent from the description that follows with reference to the attached drawings, provided purely by way of non-limiting example, wherein.

DESCRIPTION OF THE INVENTION

Figure 1:
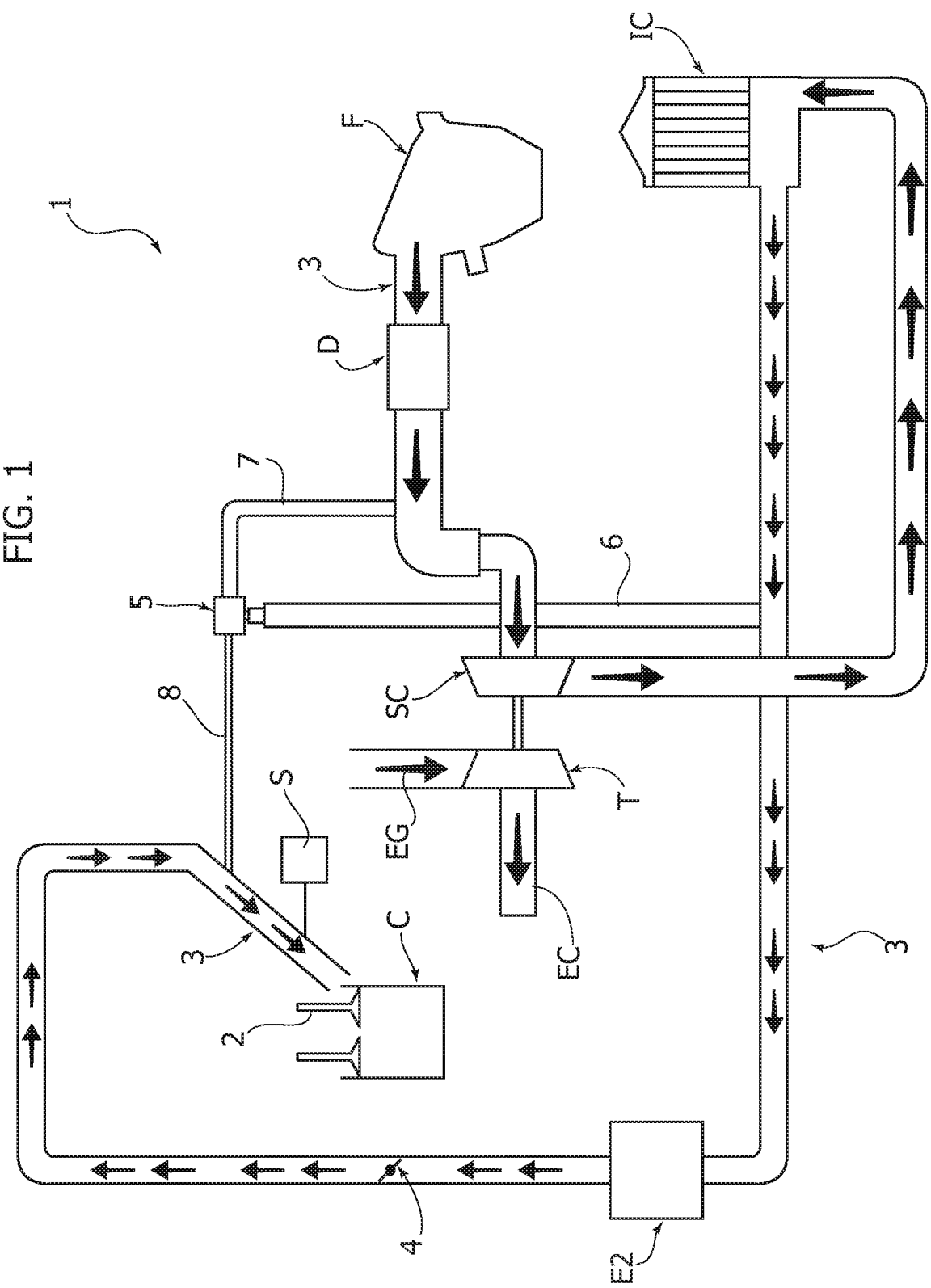
FIG. 1 shows a diagram of a system for feeding air to an internal combustion engine of a motor-vehicle, according to the invention.

In the drawings, numeral 1 indicates—in its entirety—a system for feeding air to an internal combustion engine of a motor-vehicle. The internal combustion engine is represented in the diagram of FIG. 1 by one of its cylinders, which is indicated by C. The cylinder C is associated with at least one intake valve 2, which controls the supply of air into the cylinder C through an air feed duct 3. At its upstream end, the duct 3 is provided with an air filter F, through which the ambient air is drawn into the duct 3. Along the duct 3, downstream of the filter F, a debimeter D and a supercharging compressor SC are arranged in succession, the compressor including a rotor that is driven into rotation by a turbine T, which is actuated, according to a conventional art, by a flow of exhaust gases EG, which runs along the exhaust duct EC.

Still along the duct 3 for feeding air to the engine, a heat exchanger, or intercooler, IC is interposed, downstream of the air compressor SC, which, according to a conventional art, uses the coolant circulating in the cooling circuit of the engine (not illustrated) to cool the air flow fed by the air compressor SC.

Still along the duct 3 for feeding air to the engine, an evaporator E2 is arranged, downstream of the intercooler IC, in which coolant circulates in an air conditioning circuit of which the motor-vehicle is equipped.

The reference number 4 indicates a throttle valve, interposed in the feed duct 3 downstream of the evaporator E2.

The reference number 5 indicates a valve interposed in a duct for recirculating the feed air. This recirculation duct includes a portion 6 that originates from the duct 3, at a point downstream of the intercooler IC and upstream of the evaporator E2, and that terminates in the valve 5, and a second portion 7 that starts from the valve 5 and terminates in the duct 3, upstream of the compressor SC. The valve 5 receives, via a duct 8, a pressure signal of the feed air immediately upstream of the cylinder C, and opens to balance the pressure values upstream and downstream of the compressor SC, and is used to control and/or limit the maximum pressure exerted by the turbocompressor during the release steps of the accelerator, or rather, when the air introduced into the intake manifolds is greater than the amount required by the engine itself.

Figure 2:
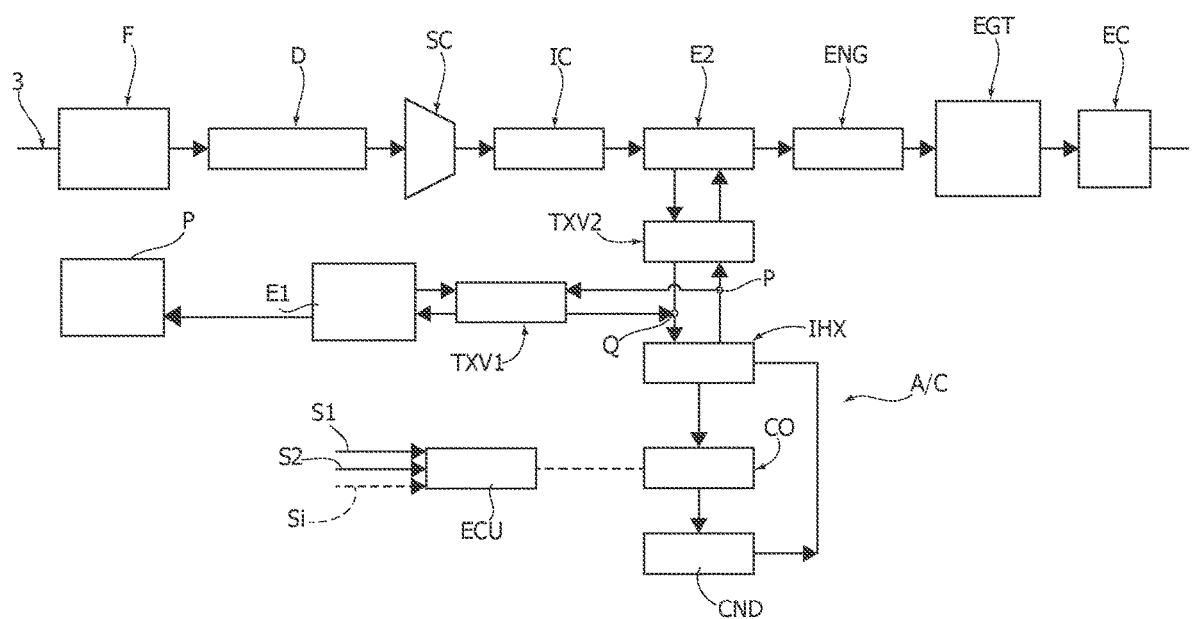
FIG. 2 is an additional block diagram of an embodiment of the system according to the invention.

In FIG. 2, the reference number 3 schematically indicates the air feed duct, in which the air filter F, the debimeter D, the air compressor SC, the intercooler IC and the evaporator E2 are interposed in series. FIG. 2 also schematically shows the duct for exhaust gases EC, which originates from the engine exhaust manifold (indicated by the reference "ENG"). In the exhaust duct EC, downstream of the engine ENG, the devices for treating the exhaust gases are placed, indicated as a whole by the reference EGT, which can vary according to the type of vehicle and the type of engine (for example, gasoline engine or diesel engine).

The reference A/C indicates—in its entirety—the air conditioning system of which the motor-vehicle is equipped.

The A/C system comprises a compressor CO for the coolant and a condenser CND that receives the coolant from the compressor CO.

The reference TXV1 indicates a first expansion valve, for example, a thermostatic valve or an electronically-controlled valve, which receives condensed fluid from the condenser CND. The expanded fluid leaving the first expansion valve TXV1 passes through a main evaporator E1 for refrigerating an airflow directed towards the passenger compartment of the motor-vehicle. The fluid leaving the evaporator E1 returns through the first expansion valve TXV1 towards the compressor CO.

In the system according to the invention, the A/C air cooling system also comprises an inner heat exchanger IHX in which the flow of coolant that goes from the condenser CND to the first expansion valve TXV1 enters into a heat exchange relationship with the flow of fluid returning from the main evaporator E1 towards the compressor CO.

As already indicated above, the A/C system comprises a second evaporator E2, which is interposed in the duct for feeding air to the engine and which is connected to the coolant circuit in parallel with the main evaporator E1. A second expansion valve TXV2 is interposed in the connection between the condenser CND and the auxiliary evaporator E2.

As can be seen in FIG. 2, the inner heat exchanger IHX is connected in such a way that the fluid coming from the condenser CND passes through the inner heat exchanger IHX and then divides at the point P into two lines directed towards the two expansion valves TXV1 and TXV2, and towards the two evaporators E1, E2. In the same way, the flows leaving the two evaporators E1, E2, after having passed through the expansion valves TXV1, TXV2, flow together into a point Q and then cross the inner heat exchanger IHX, wherein they enter into a heat exchange relationship with the flow coming from the condenser CND.

All the components of the A/C system are not illustrated in detail here, as they can be made in any known manner.

Activation of the coolant compressor CO is controlled by an electronic controller ECU based on a series of signals $S_1$, $S_2$, ..., Si. In one example embodiment, signal S1 can represent a signal indicating a manual operation of the A/C system by a driver of the motor-vehicle, and signal S2 can represent a signal indicating an air temperature required by the driver. According to a conventional art, activation can be controlled, for example, in that the compressor CO has a rotating shaft, which is connected in rotation with the shaft of the internal combustion engine ENG, with the interposition of an electrically-operated friction clutch (not shown). The controller ECU inserts and disengages this friction clutch to cause activation and deactivation of the coolant compressor CO.

The controller ECU controls the activation of the coolant compressor CO, both as a function of the request for air conditioning of the passenger compartment P of the motor-vehicle, and as a function of the request for cooling the air for feeding the engine, To this end, the signals sent to the controller ECU include a signal indicating a manual operation of the air conditioning system A/C by the driver, a signal indicating the air temperature required by the driver, and a signal indicating the current air temperature in the passenger compartment P of the motor-vehicle. Furthermore, in order to detect the need for cooling the air fed to the engine, the system comprises a sensor S of the air feed temperature (FIG. 1), which sends a signal indicating this value to the controller ECU.

Finally, the electronic controller ECU receives signals indicating the operating conditions of the engine and, in particular, a signal indicating the load of the engine, corresponding to the position of the accelerator pedal, and a signal indicating the rotational speed of the engine.

In the preferred embodiment, the electronic controller ECU takes into account, at all times, the request for cooling the air fed to the engine and the request for cooling the passenger compartment P of the motor-vehicle, always favoring the thermal load which has the highest cooling requirement among the passenger compartment P and the intake air.

According to the invention, the electronic controller ECU also controls the activation of the coolant compressor CO in order to favor low fuel consumption. To this end, the system is configured to enable the feeding of coolant through the auxiliary evaporator E2 only when the engine load is below a predetermined threshold, that is, only during the release steps of the accelerator pedal, when the impact on fuel consumption is lower.

According to another preferred characteristic, the first expansion valve TXV1 and the second expansion valve TXV2 are electronically-controlled expansion valves, and the electronic controller ECU is configured to control both the activation of the compressor coolant CO, and the first and second expansion valves TXV1, TXV2, according to signals indicating both the request for cooling the air fed to the engine, and the request for air conditioning of the passenger compartment P of the motor-vehicle, in such a way that the system can operate selectively in the following ways:

with the coolant compressor CO in an active condition, with first and second expansion valves both opened, so as to activate both the main evaporator E1 for cooling the air in the passenger compartment P of the motor-vehicle, and the auxiliary evaporator E2 for additional cooling of the air fed to the engine, with the coolant compressor CO in an active condition, with first expansion valve TXV1 opened and second expansion valve TXV2 closed, so that only the main evaporator for cooling the air in the passenger compartment P of the motor-vehicle is activated, while the auxiliary evaporator is not activated, with the coolant compressor CO in an active condition, with first expansion valve TXV1 closed and second expansion valve TXV2 opened, so that only the auxiliary evaporator E2 is active, while the main evaporator is not activated, and with the coolant compressor CO deactivated, so that both evaporators E1, E2 are inactive.

As is clear from the above description, the system according to the invention allows, on one hand, satisfaction of the need for greater cooling of the air fed to the engine, which occurs in supercharged engines, but, on the other hand, it ensures a high efficiency of the system in all engine operating conditions and allows the required results to be obtained without causing an appreciable increase in fuel consumption.

Of course, without prejudice to the principle of the invention, the details of construction and the embodiments may vary widely with respect to those described and illustrated purely by way of example, without departing from the scope of the present invention, as set forth herein by way of example and not limitation.

What is claimed is:

1. A system for feeding air to an internal combustion engine of a motor-vehicle being equipped with an air conditioning circuit, the system comprising:
    an air feed duct for feeding air to the internal combustion engine;
    a turbocharger including:
        an air compressor for compressing the air fed to the internal combustion engine, arranged along said air feed duct; and
        a turbine driven by a flow of exhaust gases of the internal combustion engine, for driving the air compressor by a shaft;
    a coolant that circulates in a cooling circuit of the internal combustion engine;
        a heat exchanger positioned in said air feed duct, downstream of the air compressor, and configured to cool a flow of air fed by the air compressor, using the coolant that circulates in the cooling circuit of the internal combustion engine;
        an auxiliary evaporator, interposed in the air feed duct downstream of the heat exchanger, to further cool the flow in said air feed duct to the internal combustion engine by a coolant fluid that circulates in said air conditioning circuit of the motor vehicle;
    wherein said air conditioning circuit further comprises:
        a coolant compressor;
        a condenser receiving the coolant fluid from the coolant compressor;
        a first expansion valve receiving the coolant fluid from said condenser;
        a main evaporator including:
            an inlet receiving the coolant fluid coming from the first expansion valve, for cooling a flow of air directed towards a passenger compartment of the motor-vehicle; and
            an outlet for the coolant fluid of said main evaporator being connected to an inlet of the coolant compressor;
            wherein the auxiliary evaporator is connected in parallel with the main evaporator within said air conditioning circuit,
        a second expansion valve interposed between said condenser and the auxiliary evaporator;
        an inner heat exchanger receiving the flow of the coolant fluid from the condenser to the first expansion valve to have a heat exchange relationship with the flow of the coolant fluid flowing from the main evaporator back to the coolant compressor; and
        wherein the coolant fluid flowing from the condenser through said inner heat exchanger divides into two lines directed towards the respective first and second expansion valves, while the coolant fluid flowing out from the main evaporator and from the auxiliary evaporator converge into a single flow before passing through the inner heat exchanger; and
        an electronic controller having executable instructions stored in a non-transitory readable medium/processor to execute of:
            controlling activation of said coolant compressor, according to both a request for air conditioning of the passenger compartment, and a request for cooling the air fed to the internal combustion engine; and
            controlling the second expansion valve and activation of said coolant compressor for feeding coolant through the auxiliary evaporator only when an engine load of the internal combustion engine is below a predetermined threshold.

2. The system according to claim 1, wherein the electronic controller further includes executable instructions of enabling the activation of the coolant compressor according to a signal indicating a temperature of the air fed to the internal combustion engine.

3. The system according to claim 1, wherein said first expansion valve and said second expansion valve are electronically-controlled expansion valves; and
    wherein according to signals indicating both the request for cooling the air fed to the internal combustion engine, and the request for cooling the air directed towards the passenger compartment of the motor-vehicle, said electronic controller further includes executable instructions of:
    activating the coolant compressor and opening both the first and second expansion valves to activate both the main evaporator for cooling the air directed towards the passenger compartment of the motor-vehicle, and the auxiliary evaporator for additional cooling of the air fed to the engine;
    activating the coolant compressor, opening the first expansion valve, and closing the second expansion valve, to supply the coolant fluid to the main evaporator for cooling the air directed towards the passenger compartment of the motor-vehicle and to prevent supply of the coolant fluid to the auxiliary evaporator;
    activating the coolant compressor, closing the first expansion valve, and opening the second expansion valve to supply the coolant fluid to the auxiliary evaporator and to prevent supply of the coolant fluid to the main evaporator; and
    deactivating the coolant compressor to cause both the main and auxiliary evaporators to be inactive.

* * * * *